United States Patent [19]

Elmer

[11] Patent Number: 4,738,032
[45] Date of Patent: Apr. 19, 1988

[54] INERTIAL PENDULUM

[76] Inventor: William B. Elmer, R.F.D. Campton, Thornton, N.H. 03223

[21] Appl. No.: 385,481

[22] Filed: Jun. 7, 1982

[51] Int. Cl.[4] .............................................. G01C 9/12
[52] U.S. Cl. ........................................ 33/392; 368/181
[58] Field of Search ............... 368/165, 182, 179, 180, 368/181, 134–138; 434/300, 302; 40/485; 33/391, 392, 399, 398, 308, 397, 402; 272/85; 185/29; 74/99 R, 103; 254/404; 446/227

[56] References Cited

U.S. PATENT DOCUMENTS

| 196,702 | 10/1877 | Richmond | 368/181 |
| 399,966 | 3/1889 | Buchanan | 33/141 E |
| 408,955 | 8/1889 | Davies | 368/81 |
| 481,020 | 8/1892 | French | 254/409 |
| 566,213 | 8/1896 | Mullen | 254/404 |
| 1,317,128 | 9/1919 | Ferguson | 46/77 |
| 3,290,817 | 12/1966 | Kravath | 446/227 |
| 3,596,365 | 8/1971 | Verhagen | 33/366 |
| 3,621,605 | 11/1971 | Witiak | 46/242 X |

FOREIGN PATENT DOCUMENTS

| 892408 | 1/1944 | France | 368/81 |
| 13268 | of 1895 | United Kingdom | 33/138 |
| 125711 | 4/1919 | United Kingdom | 33/401 |

Primary Examiner—Harry N. Haroian
Attorney, Agent, or Firm—Charles Hieken

[57] ABSTRACT

A pendulum has a weight suspended from a bar at an essentially frictionless pivot near the center of gravity of the weight.

10 Claims, 1 Drawing Sheet

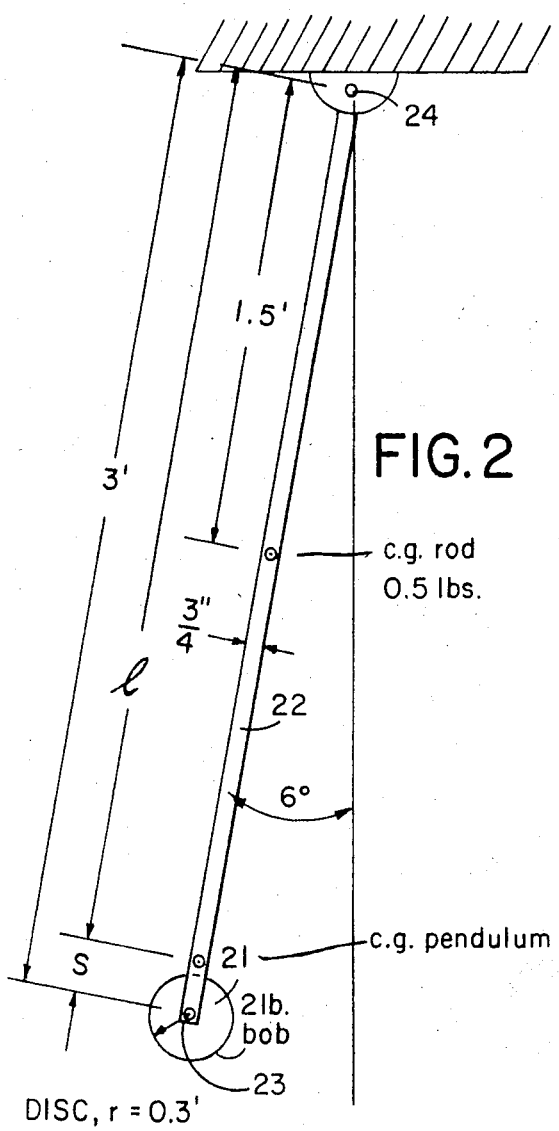
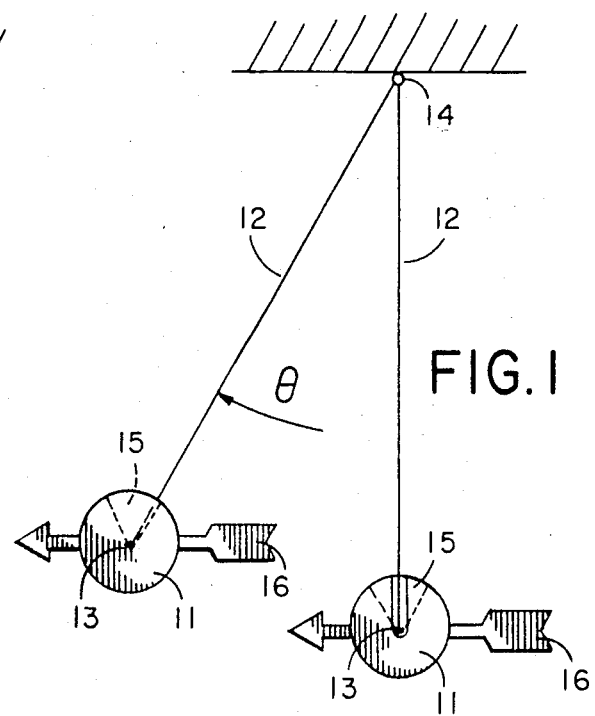
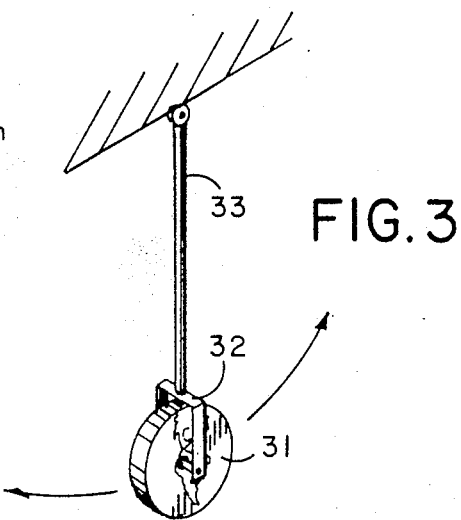
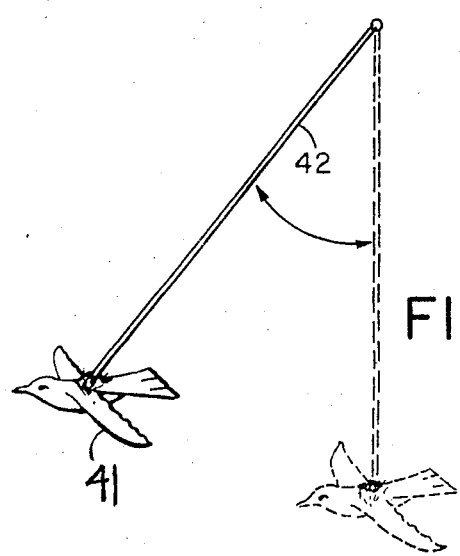

INERTIAL PENDULUM

The present invention relates in general to pendulum measuring and more particularly concerns novel apparatus and techniques for measuring time and length with novel pendulum structure based on a general equation for the pendulum characterized by improved regularity in response to relatively little exciting energy. Any body suspended from a fixed support and free to oscillate under the influence of a gravity can be considered a pendulum. A typical pendulum consists of a weight or "bob" hung from a rigid rod. A rod or bar without a bob, typically of uniform cross section, may also function as a pendulum.

The period T for a simple pendulum is $2\pi\sqrt{L/g}$ where L is the length of a weightless rod and g is the acceleration of gravity. For a discussion of pendulums reference is made to 9 MCGRAW-HILL ENCYCLOPEDIA OF SCIENCE AND TECHNOLOGY 696–98 (1977). That article describes determining a more accurate expression for the period T of a simple pendulum when the motion of the pendulum is not limited to small amplitudes involving the use of elliptic integrals.

It is an important object of this invention to provide a novel pendulum.

It is a further object of the invention to provide an improvement over the horizontal-inertial pendulum, (the so-called Foucault pendulum) to demonstrate inertial action in the vertical plane as well as in the horizontal.

A still further object is to provide a dual-inertial pendulum demonstrating the translation of oscillating bodies without accompanying rotation.

A search of subclasses 134–38 of class 368 and subclasses 300 and 302 of class 434 uncovered the following patents as deemed most pertinent: U.S. Pat. Nos. 1,912,094, 1,636,234, 776,574, 754,397, 531,935, 9,310, German Pat. No. 816,916, Russian Pat. No. 147,797.

According to the invention, in a pendulum comprising a body suspended from a fixed support and free to oscillate under the influence of gravity, the body is mounted on an essentially frictionless horizontal axis substantially at its center of gravity and normal to the direction of swing so that as the pendulum thus formed oscillates, the orientation of the body about its frictionless horizontal axis substantially through its center of gravity does not change during oscillation. According to a preferred feature of the invention, the center of gravity of the body is located very slightly below the frictionless axis, just enough to keep the body in an initial preferred position, but not enough to deviate the body from its initial position during oscillation.

Numerous other features, objects and advantages of the invention will become apparent from the following specification when read in connection with the accompanying drawing in which:

FIG. 1 diagrammatically illustrates a novel pendulum according to the invention in two different positions;

FIG. 2 shows another embodiment of the invention in which a disc is suspended from a rod;

FIG. 3 is a pictorial representation of an embodiment of the invention showing a fork support; and FIG. 4 is a pictorial representation of another embodiment of the invention showing the weight in the form of a bird that remains horizontal.

With reference now to the drawing and more particularly FIG. 1 thereof, there is shown an embodiment of the invention in which a ball 11 is suspended from a rod 12 on a frictionless axis 13 essentially through the center of gravity of the ball with rod 12 suspended for pivoting about fixed axis 14. Ball 11 is formed with a sectoral slot 15 typically subtending an angle $2\theta$ which is the maximum angular displacement of ball 11 from a point immediately below pivotal axis 14. Ball 11 carries a horizontal arrow 16 to illustrate how ball 11 does not rotate about the horizontal axis through its center of gravity about which it is suspended as it oscillates. In constructing a Foucault-type pendulum according to the invention, slot 15 may be made conical to assure ample clearance with the supporting rod under all circumstances.

Having described a structure according to the invention, it is appropriate to discuss principles of pendulum operation which have been discovered and applied in connection with the invention. It has been discovered that a general equation for the pendulum is $$t = \pi c \sqrt{\frac{l^2 + \rho^2}{gl}} \quad (1)$$

where t = seconds per half period (complete swing in one direction.)

g = acceleration of gravity (conventionally taken as 32.2 feet/sec/sec. Values for many specific locations on the earth are readily available.)

l = length of pendulum (distance from supporting axis to center of gravity (cg) of entire pendulum including rod, in feet.

$\rho$ = radius of gyration about center of gravity of complete pendulum including rod, in feet.

C = amplitude correction factor depending upon angle of swing $\theta$ from vertical.

The term $\sqrt{l^2+\rho^2}$ is sometimes called the "hypotenuse of gyration" h, in which case the general Eq. 1 becomes $$t = \frac{\pi C h}{\sqrt{gl}} \quad (2)$$

This exact pendulum equation is a solution of an elliptic integral of the first kind which yields an infinite series of rapid convergence. Several approximate expressions are in common use for C, such as, $$C = \left(\frac{9-\cos\theta}{8}\right) \text{ or } \left(1-\frac{H}{8l}\right) \text{ or } \left(1-\frac{\theta^2}{16}\right) \quad (3)$$

where H=vertical component of travel of cg in feet. Some values of C to 5 places are,

TABLE 1

| $\theta°$ = | 2 | 2.3 | 4 | 6 | 7.2 | 8 | 10 |
| 0 | | | | | | | |
| C = | 1.00007 | 1.0001 | 1.0003 | 1.0007 | 1.0010 | 1.0012 | 1.0019 |
| 1 | | | | | | | |

Two classic pendulum definitions have been used in the past,

1. A simple pendulum is a ponderable mass of zero dimensions suspended from a fixed point by a weightless inextensible thread, swinging in a circular arc in unison with said arc under the action of gravity. The half period is, $$t(\text{half period}) = \pi \sqrt{\frac{l}{g}} \left(1 + \frac{\theta^2}{16}\right)$$

2. A compound pendulum comprises a relatively heavy bob suspended from a fixed point by a rigid rod, and swinging in a circular arc in unison with said rod under the action of gravity. the half period is, $$t(\text{half period}) = \frac{\pi k}{\sqrt{gl}} \left(1 + \frac{\theta^2}{16}\right) \quad (5)$$

where K=radius of gyration of pendulum about its supporting axis.

Eqs. 4 and 5 have been unified in the general Eq. 1 given above and the definition for a simple pendulum may be rewritten as, A simple pendulum is any pendulum having a weightless rigid rod carrying either (1) a ponderable bob of negligible radius or (2) any bob that is free to rotate about its center of gravity without friction, in the plane of oscillation.

For a simple pendulum $\rho$ of Eq. 1 can therefore be neglected and the equation reduces to the old Eq. 4, $$t = \pi C \sqrt{\frac{l}{g}} \quad (6)$$

If a pendulum structure is complicated and/or irregular, the location of its center of gravity may be found by balancing the entire pendulum, including rod, on a knife edge.

The general equation for moment of inertia is, $$J = \Sigma W r^2 \quad (7)$$

where r is distance between center of gravity and each component element of weight W in feet.

The general equation for radius of gyration is, $$\rho = \sqrt{\frac{J}{W}} \quad (8)$$

where W is total weight in pounds.

For discs, $$J = \tfrac{1}{2} W r^2 \quad (9)$$

and $$\rho = \frac{\text{radius of disc}}{\sqrt{2}} \quad (10)$$

For hoops (of zero section), $$J = W r^2 \quad (11)$$

and $$\rho = \text{radius of hoop} \quad (12)$$

for a rectangular rod of width a in feet, pivoted at one end, $$J = (W/12)(4l^2 + a^2) \quad (13)$$

and $$\rho = \sqrt{\frac{4l^2 + a^2}{12}} \quad (14)$$

In an actual embodiment of the invention, the hub of a 25-inch bicycle wheel was suspended from two 18-inch long very light straps, rigid in the plane of oscillation, with the wheel free to rotate or spin on its hub with negligible friction. A small catch was attached to one of the straps just below the wheel rim so that it could be readily attached or detached from a spoke of the wheel without altering any of the pendulum parameters.

The pendulum so constructed was suspended from a hook and was found capable of oscillating freely in the plane of the wheel through relatively small amplitudes for considerable periods of time without the need for a continuous driving mechanism. The natural period of the pendulum was thus easily countable.

With the wheel prevented from rotating locked to the supports by the catch as in the prior art, the natural period was found to be 38 complete oscillations per minute whereas the count increased to 44 per minute with the catch released and the wheel free to rotate according to the invention. With the wheel free to rotate on its hub according to the invention it no longer swung as a unit in phase with the supporting straps, but remained at a fixed angle in space, its only motion being that of translation along the circular path of the pendulum.

The 25-inch bicycle wheel was then replaced with a compact bob of equal weight (3¾ lb.). This compact bob consisted of two 1¼ inch dia. lead cylinders, slid lengthwise along a slender rod, 15 inches on centers, hung horizontally and transverse to the plane of oscillation, with no provision for free rotation about the central axis of the rod. In this condition the pendulum oscillated 44 times per minute, duplicating the period of the 25-inch wheel when free.

The 3¾ lb. compact bob was then turned 90° in the horizontal plane, bringing it parallel with the plane of oscillation. When left free to translate in this plane according to the invention the oscillation rate of the pendulum was again 44 per minute. When, however, it was locked to swing in unison with the support straps as in the prior art, the rate dropped to 40 per minute.

These experiments demonstrated that this and any pendulum bob other than one having a surface of revolution about its vertical axis will oscillate at different periods depending upon its orientation, and conversely, that for the most extreme timekeeping accuracy every pendulum bob should be uniform about its vertical axis. Otherwise, slight departures from the plane of oscillation will introduce slight variations in period. It also follows that the pendulum rod should be circular for the most extreme accuracy in timekeeping.

As a final test, the heavy bobs were replaced by a ¼-inch dia. brass rod (3½ oz.) placed transverse to the plane of oscillation. This gave a count of 45 oscillations per minute.

These experiments demonstrated that it is primarily the rotational component of the motion of a pendulum bob that slows the rate of a compound pendulum below that of a simple pendulum of identical parameters, and that if any pendulum bob is pivoted without friction at its center of gravity, the period of the pendulum is shortened, approaching that of a "simple" pendulum. This is true regardless of the fact that no change whatever be made in the pendulum constants such as configuration, mass, centers of gravity, and other constants.

As a pendulum swings from its starting angle to the vertical position, where its velocity is maximum, potential energy is converted to kinetic energy. The total kinetic energy at the bottom of the swing is the sum of two components, the kinetic energies of translation and rotation. Then, $$\text{Total kinetic energy} = \tfrac{1}{2}mv^2 + \tfrac{1}{2}J\omega^2 = (HW)/g \tag{15}$$

where
 W = entire weight of pendulum including rod
 v = velocity of center gravity of W
 J = moment of inertia about center of gravity of W
 $\omega$ = angular velocity of pendulum
 g = acceleration of gravity
 H = vertical component of travel of center of gravity during swing Since $v = \omega\rho$, the first term (translation) becomes, $$KE_{trans.} = \tfrac{1}{2}(W/g)(\omega l)^2 \tag{16}$$

From Eqs. 7 and 8 the kinetic energy of rotation becomes, $$KE_{rot.} = (\rho^2 W \omega^2)/2g \tag{17}$$

The kinetic energy of the entire pendulum with wheel locked is then, $$KE_{locked} = \frac{W(\omega l)^2}{2g} + \frac{W\rho^2\omega^2}{2g} = HW \tag{18}$$

When the wheel is freed it no longer rotates in unison with the rod and the entire kinetic energy appears as translation only, shortening the period. The, $$KE_{free} = \tfrac{1}{2}(\omega' l)^2 = HW \tag{19}$$

where $\omega'$ is the angular velocity with wheel free. Combining 18 and 19, $$\frac{W(\omega l)^2}{2g} + \frac{W\rho^2\omega^2}{2g} = \frac{(\omega' l)^2 W}{2g} \tag{20}$$

and $$\omega^2 l^2 + \omega^2 \rho^2 = (\omega')^2 l^2 \tag{21}$$

from which, $$\frac{\omega'}{\omega} = \frac{\sqrt{l^2 + \rho^2}}{l} \tag{22}$$

Since in harmonic motion, angular velocity is inversely proportional to time of oscillation, $$\frac{\omega'}{\omega} = \frac{t}{t'} = \frac{\sqrt{l^2 + \rho^2}}{l} \tag{23}$$

and $$t = t' \frac{\sqrt{l^2 + \rho^2}}{l}$$

Since for a simple pendulum $t' = \pi C \sqrt{l/g}$, $$t = \pi C \sqrt{\frac{l}{g}} \left( \frac{\sqrt{l^2 + \rho^2}}{l} \right) \tag{24}$$

yielding Eq. 1, $$t = \pi C \sqrt{\frac{l^2 + \rho^2}{gl}} \tag{1}$$

The classic definition for the simple pendulum is unsatisfactory inasmuch as it defines the period of a physically impossible embodiment, i.e. the rod must be a weightless line and the heavy bob must be confined to a geometric point. Since the equation (Eq. 6) so defined is approximate the new definition for the simple pendulum given above is no less rigorous, and is preferred, since it can be demonstrated with real structures.

Eq. 1 is preferable to the classic Eqs. 4 and 5 because it possesses the advantage of unifying the two, which make needless and artificial distinctions between "simple" and "compound" types. The first and major distinction between simple and compound pendulums as newly defined lies not in the compactness of the ponderable bob, but in its freedom to rotate. the second and minor distinction between the two is the difference between weight and weightlessness of the pendulum rod. The "thread" supporting the dimensionless bob of a simple pendulum need only be strong enough to support the weight of the bob without snapping. The ratio of thread weight to bob weight can thus be entirely negligible in practice. Since the bob can be sufficiently heavy as to render the thread supporting it relatively weightless, a real pendulum can be genuinely "simple", beyond any practical requirements of precision. The proposed redefintion for the simple pendulum thus brings the concept of a theoretical and ideal structure down into the realm of practical reality.

In Eq. 1 it is necessary to calculate the radius of gyration of the pendulum about its center of gravity whereas the classical equation requires the calculation to be about the axis of support. The former is no less difficult to calculate than the latter, thus no disadvantage accrues from the use of the Eq. 1.

Turning now to pendulum length parameters a pendulum possesses three length parameters,
 1. Length. (Distance from axis of support to overall center of gravity.)
 2. Radius of Gyration.
 3. Center of percussion. Also called the "center of oscillation".

The radius of gyration is the distance from the axis of support to an imaginary point at which the entire mass could theoretically be concentrated without changing the time of oscillation.

The center of percussion has been defined in various ways. It has been defined as (1) an imaginary point at which all the forces acting on the pendulum could be concentrated in order to produce the same oscillation, (2) the point at which it could be struck without producing a shock at the point of support and (3) the center of gravity of a simple pendulum having the same period.

Striking a pendulum at its center of gravity from any direction would produce translation only. It would be necessary to strike the pendulum at some point below the radius of gyration, and in one certain specific direction only, in order to duplicate its swing. This is the center of percussion. An example is the "sweet point" of a baseball bat at which impact with the ball does not jar the batter's hands.

The radius of gyration of a conventional pendulum has been found to lie at the geometrical mean between the distances from the axis of support to the center of gravity, and the center of percussion. It follows that the center of percussion or the radius of gyration of a pendulum (of known length) can be readily found if the other is known. Thus, $$\rho = \sqrt{lP} \quad (23)$$

and $$P = \rho^2/l \quad (24)$$

where P=distance from support axis to center of percussion.

Some pendulums consist of simple rods or bars supported to oscillate about one end. It was shown above that only a circular pendulum can be free of slight time variances resulting from slight twistings of the pendulum. By using a rod of circular cross section a bar pendulum may serve as a primary reference standard of length. Equation 1 is exact for the bar pendulum.

Thomas Jefferson once proposed that a seconds pendulum consisting of a plain bar be adopted as our national standard of length. This was rejected because of variations in the gravitational constant at different geographic locations and a lack of reproducibility. It seems likely that the lack of reproducibility resulted from an assumption that the size of the rod's cross section could be neglected, an assumption that persists to the present day. With the radius (or hypotenuse) of gyration taken into account, and with gravitational data now plentiful, this aspect of the invention can function as a primary reference standard. Values for the acceleration of gravity are readily available to 6 decimal places at 146 different locations worldwide. "Weighing the earth" at other locations not already listed, to 6 or more decimal places would pose no contemporary problem. A seconds pendulum might actually prove to be even more accurate and much more readily accessible in general than the existing standard based on the wavelength of an orange line in the spectrum of krypton 86.

The present international standard of length under both conventional and S1 systems is given as 1,650,763.3 wavelengths of krypton measured under elaborately specified conditions, as being equal to one S1 meter. The procedure for verifying this distance does not inspire confidence. Accuracy to 8 decimal places is claimed if every one of numerous precautions is carefully observed during the process. First, a special krypton lamp must be obtained with the purity of K86 not less than 99%. Then the lamp must be operated with the coldest point of the lamp no higher than 63° Kelvin (pressure then "about" 0.03 mm of mercury). The current density in the lamp must not exceed just 4 milliamperes per square mm. A hot-cathode direct current lamp must be observed only in the direction of the anode (angle not stated). All the foregoing precautions apply only if the test is made in vacuo. If made in air the wavelength is shorter and the standard number of wavelengths would be increased to 1,651,720.80, a departure from the standard value beginning at the third decimal place.

It is evident that present comparisons against the primary length standard can only be possible at highly sophisticated laboratories, and are even then extremely precarious. The present invention represents a simpler but at least equally precise primary length standard that could be employed anywhere in the world, even by less technologically advanced nations.

A standard minute pendulum may consist of a one-inch diameter solid round bar of aged invar, set to oscillate through an angle of exactly 2° from vertical while at a standard temperature in vacuo, released initially from a thread attached at its center of percussion.

The moment of inertia of any circular rod about its center of gravity is, $$J_{cg} = \frac{W(3r^2 + h^2)}{12} \quad (25)$$

where
r=radius of bar
h=length of bar
and the radius of gyration is, $$\rho_{cg} = \sqrt{\frac{3r^2 + h^2}{12}} \quad (26)$$

The length of such a seconds pendulum would be calculated using Eq. 1 as follows, $$l_{cg} = \frac{h}{2} \quad (27)$$

$$1 \text{ second} = \pi C \sqrt{\frac{\left(\frac{h}{2}\right)^2 + \frac{3r^2 + h^2}{12}}{\frac{h}{2} g}}$$

from which $$h = \frac{3g}{4^2 C^2} + \sqrt{\left(\frac{3g}{4^2 C^2}\right)^2 - \frac{3r^2}{4}} \quad (28)$$

When the bar is a theoretical line and r=0, Eq. 25 reduces to $$J_{cg} = Wh^2/12 \quad (29)$$

and h=58.72578046 inches.
With C=1.000066423 for the 2° swing,
    h=58.72965878 inches.
If the bar is one inch in diameter r=0.5"=15 1/24'
and h=58.72256506C, or h=58.72646559 inches.
which is a reduction of 0.00319319 inches, or 0.0054371 percent.

With such a bar it would be possible to redefine the standard U.S. inch as 1/58.72646559 part of, or 0.0170280978 into the length of the seconds pendulum.

It is commonplace to be able to measure the diameter of a 1" diameter rod to a precision of less than 1 mil. If such a pendulum were measured and found to be 1 mil oversize, the reduction in length necessary to correct the period of the bar would be only 1.088 part in $10^7$.

Referring to FIG. 2, there is shown a diagrammatic representation of an embodiment of the invention in the form of a compound pendulum having a disc 21 suspended from a rod 22 pivotal about the disc axis 23 with the pendulum suspended from pivot point 24.

The period of this compound pendulum comprising a 36-inch rod 22 of uniform rectangular cross-section, ¾ inch wide, weighing one half pound, carrying a 6 inch diameter disc 21 at the disc center of gravity, weighing 2 pounds may be computed as follows for a swing angle, 6° from vertical.

To find length l the center of gravity is located as follows,
Moment of disc bob about cg=2s
Moment of rod about cg=0.5(1.5−s)
then
2s=0.5(1.5−s)
s=0.3
and
l=3−0.3=2.7'

To find radius of gyration of pendulum about 20 cg, $$J_{disc} = \tfrac{1}{2}Wr^2 + Ws^2 = \frac{2(0.25)^2}{2} + 2(0.3)^2 = 0.2425 \tag{30}$$

$$J_{rod} = \frac{W}{12}\left[3^2 + \left(\frac{0.75}{12}\right)^2\right] + W(1.5 - 0.3)^2 = 1.0952 \tag{31}$$

$$J_{cg} = 0.2425 + 1.0952 = 1.3377 \tag{32}$$

$$\rho = \sqrt{\frac{J_{cg}}{W}} = \sqrt{\frac{1.3377}{2 + 0.5}} = 0.731' = 8.78'' \tag{33}$$

From Eq. 1, $$t = \pi C \sqrt{\frac{l^2 + \rho^2}{gl}} \tag{1}$$

From Table I, $C_{60}=1.00007$, then, $$t = \pi(1.0007)\sqrt{\frac{2.7^2 + .731^2}{3.2 \times 2.7}} = 0.9431 \text{ sec.} \tag{34}$$

and period=1.8862 sec.

The well-known inertial, or Foucault, pendulum is commonly used in various scientific museums and organizations to demonstrate, by means of its inertia, the rotation of the earth. A description and picture of the Foucault pendulum appear, for example, in the Encyclopedia Americana, 1980, page 502, under the heading of PENDULUM. The Foucault pendulum includes a heavy metal ball supported at its top surface, that swings widely within a large calibrated circle. The present invention provides that the ball or whatever equivalent weight is substituted for the ball, is supported not at its top but instead is supported pivotally close to its center of gravity, with the result that the vertical angular attitude of the ball remains unchanged in space, as a result of its rotational inertia, thereby translating only, as the pendulum swings. This action makes it practicable to include a pointer in the ball, which pointer remains permanently horizontal, or directed at any other desired constant attitude, throughout the oscillations of the pendulum, and thus is capable of pointing elegantly toward the indicia as marked on the large surrounding circle.

A weight of any shape can be substituted for the ball and used to advantage for any desired purpose, such as for decoration, advertising or entertainment.

The single-inertial Foucault pendulum demonstrates Newton's first principle of rectilinear motion, that a body moving in a straight line tends to maintain that direction of motion unless acted upon by some external force. The Foucault pendulum, however, merely demonstrates the maintenance of direction, but does not also demonstrate maintenance of rotary inertia, since the Foucault ball is subject to oscillating rotation in the plane of the pendulum swing, in unison with the translational swing.

In the present invention, a second form of inertia, that of rotation, is also simultaneously demonstrated. It can be stated as a fourth law of motion that a rotating body continues to rotate indefinitely until acted upon by an external rotatory force. This statement is analogous to Newton's first law of motion, which is specifically limited to linear motion. When applied to the Foucault pendulum, my invention transforms said pendulum into a new, dual-inertial type simultaneously demonstrating both directional and rotational inertia in a single structure.

In addition to demonstrating the dual-inertial principle my pendulum can be used not only as a scientific apparatus but as a decorative, advertising or entertaining novelty as well. In place of the ball, any of an unlimited variety of other weight forms could be substituted. Examples of such substitutions are (1) a world globe or a two-sided world disc which retains its fixed orientation as it swings, (2) a bird in flight, remaining horizontal at all times, (3) an airplane, ship, flying angel or other artifact maintained in natural position as it translates through the arc of pendulum swing.

Referring to FIG. 3, there is shown a pictorial representation of a two-sided world disc 31 pivotally mounted though its center from fork support 32 depending from rod 33.

Referring to FIG. 4, there is shown a pictorial representation of an embodiment of the invention in which weight 41 is in the form of a bird in flight suspended from rod 42 in essentially the same manner as ball 11 on an essentially frictionless axis substantially through the center of gravity of weight 41.

There has been described novel apparatus and techniques for providing an improved pendulum that can be used as a standard of length. It is evident that those skilled in the art may now make numerous uses and modifications of and departures from the specific apparatus and techniques disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a pendulum having a body suspended from a fixed support and free to oscillate under the influence of gravity, the improvement comprising, means including a member pivotally connected to said fixed support for suspending said body about an essentially frictionless horizontal axis thereof substantially coinciding with the center of gravity of said body about which axis said body in free to rotate, said horizontal axis being normal to the direction of swing so that as said pendulum oscillates, the orientation of said body about said horizontal axis does not change during oscillation, whereby said body exhibits only translational motion as said pendulum oscillates, wherein said axis is slightly above the axis passing through said center of gravity in order to assure maintenance of a preferred attitude.

2. The improvement in accordance with claim 1 wherein said body is a sphere and formed with a sectoral opening subtending an angle corresponding at least to the angular amplitude of oscillation of said pendulum about said fixed point.

3. The improvement in accordance with claim 2 wherein said body comprises a circular disc.

4. The improvement in accordance with claims 1 wherein said member is of circular cross section.

5. The improvement in accordance with claim 4 wherein said pendulum has a period of 1.0 second.

6. The improvement in accordance with claim 3 wherein said body includes a pointer in the plane of oscillation of said pendulum.

7. The improvement in accordance with claim 6 wherein said pointer is in arrow formation, giving the illusion of extending through the center of said body.

8. The improvement in accordance with claim 3 wherein said disc is suspended from a fork.

9. The improvement in accordance with claim 4 wherein said member is of uniform cross section throughout its length.

10. In a pendulum having a body suspended from a fixed support and free to oscillate under the influence of gravity, the improvement comprising, means including a member pivotally connected to said fixed support for suspending said body about an essentially frictionless horizontal axis thereof substantially coinciding with the center of gravity of said body about which axis said body is free to rotate, said horizontal axis being normal to the direction of swing so that as said pendulum oscillates, the orientation of said body about said horizontal axis does not change during oscillation, whereby said body exhibits only translational motion as said pendulum oscillates, wherein said body is a sphere and formed with a sectoral opening subtending an angle corresponding at least to the angular amplitude of oscillation of said pendulum about said fixed point.

* * * * *